United States Patent
Bröckerhoff et al.

(10) Patent No.: US 6,351,936 B1
(45) Date of Patent: Mar. 5, 2002

(54) DEVICE FOR ELIMINATION OF HYDROGEN

(75) Inventors: Peter Bröckerhoff, Jülich; Werner Von Lensa, Langerwehe; Ernst-Arndt Reinecke; Moritz Voswinckel, both of Aachen, all of (DE)

(73) Assignee: Forschungszentrum Jülich GmbH, Jülich (DE)

( * ) Notice: Subject to any disclaimer, the term of this patent is extended or adjusted under 35 U.S.C. 154(b) by 0 days.

(21) Appl. No.: 09/409,097

(22) Filed: Sep. 30, 1999

(30) Foreign Application Priority Data

Oct. 7, 1998 (DE) .......................................... 198 46 058

(51) Int. Cl.⁷ ................................................. F02G 3/22
(52) U.S. Cl. ................................................. 60/39.465
(58) Field of Search ..................................... 60/39.465

(56) References Cited

U.S. PATENT DOCUMENTS

| | | | | |
|---|---|---|---|---|
| 4,202,168 A | * | 5/1980 | Achenson et al. .......... | 60/39.06 |
| 5,331,806 A | * | 7/1994 | Warkentin ................ | 60/39.465 |
| 5,761,896 A | * | 6/1998 | Dowdy et al. ............. | 60/39.05 |
| 5,775,091 A | * | 7/1998 | Bannister et al. ......... | 60/39.05 |
| 5,806,298 A | * | 9/1998 | Klosek et al. ............ | 60/39.06 |
| 5,953,900 A | * | 9/1999 | Bannister et al. ......... | 60/39.05 |
| 6,071,482 A | | 6/2000 | Brockerhoff et al. | |

FOREIGN PATENT DOCUMENTS

| | | |
|---|---|---|
| DE | 21 16 330 | 10/1971 |
| DE | 23 00 499 | 7/1973 |
| DE | 4221693 | 1/1994 |
| DE | 19722305 | 10/1998 |
| WO | WO 96/18218 | 6/1998 |
| WO | WO 98/39091 | 9/1998 |
| WO | WO 99/36923 | 7/1999 |

* cited by examiner

Primary Examiner—Charles G. Freay
Assistant Examiner—William H Rodriguez
(74) Attorney, Agent, or Firm—Frishauf, Holtz, Goodman, Langer & Chick, P.C.

(57) ABSTRACT

A device for elimination of hydrogen including (a) a reactor for reacting hydrogen and oxygen, the reactor being provided with a first inlet line, a second inlet line and an outlet line, the first inlet line admits a hydrogen-containing gas mixture into the reactor, the second inlet line admits a compressed oxygen-containing gas mixture into the reactor, and the outlet line serves to discharge the resultant gas mixture after at least a partial reaction of the hydrogen and oxygen in the reactor, (b) a turbine connected to a shaft which rotates with the turbine, and (c) a compressor which is connected to the shaft, so that the shaft transmits rotational movement generated by the turbine to the compressor, the compressor receives an oxygen-containing gas mixture and provides the compressed oxygen-containing gas mixture, the compressor being joined by a conduit to the second inlet line. The device solves the problem of reacting both large and also small quantities of hydrogen in the immediate vicinity of the point of formation and ensures an adequate oxygen supply for the reaction, even for large quantities of hydrogen.

3 Claims, 3 Drawing Sheets

DEVICE FOR ELIMINATION OF HYDROGEN

BACKGROUND OF THE INVENTION

1. Field of the Invention

The present invention relates to a device for elimination of hydrogen in burners or catalytic recombiners.

2. Background Information

The danger of hydrogen escape after occurrence of accidents exists in several power and process engineering plants. If oxygen is present, a combustible gas mixture capable of either turbulent deflagration or detonation can then be formed. The pressure wave generated by detonation can jeopardize or even destroy the components of a plant or the plant itself, as well as harm the surroundings.

Large quantities of hydrogen can be expected during serious accidents in, for example, water-cooled nuclear reactors ("LWR") with non-inerted containments. In such reactors, failure of relevant safety systems and subsequent overheating of the reactor core lead to hydrogen formation by reaction of steam with the fuel cladding. In a large LWR, this process can release approximately up to 20,000 $m^3$ of hydrogen at NTP into the containment in a few hours.

Preventive safety precautions comprise inerting the gas volumes with nitrogen, as is planned or already implemented in the case of boiling-water reactors. Catalytic recombiners represent countermeasures that have been discussed, and in some cases already installed. By means thereof, the hydrogen produced both inside and outside the ignition limits is recombined to steam by an exothermic catalytic reaction, thus generating heat. Hydrogen contents with concentrations inside the ignition limits can also be burned-off conventionally after external ignition.

For elimination of hydrogen from containments, both thermal and catalytic recombiners, which transform the hydrogen together with atmospheric oxygen into steam, have been developed. Preferred, however, are catalytic systems, which work passively, or in other words, without activation and without supply of electrical power, and therefore without heating and external energy for forced flow, since otherwise their availability could be jeopardized if the external energy supply were to fail. At present, there exist two concepts which have proved their feasibility in extensive tests, some with respect to potential catalyst poisons. Both metal foils and also highly porous granules, on which platinum or palladium is deposited as catalyst, are used as substrates. A plurality of foils and granule packages (in this connection the granules are held together by wire mesh and formed into packages) are disposed vertically and parallel to each other in sheet-metal housings. The hydrogen/air mixture enters the housing at the bottom. The reaction takes place at the catalyst-coated surfaces.

One disadvantage can be seen in the prior mixing in the large volumes of containments, so that a danger of explosions in containments exists. Ignition sources cannot be ruled out in such complex plants, especially after occurrence of serious accidents. Moreover, the oxygen and hydrogen reaction partners are fed to the recombiners in the form in which they are produced by mixing or in which they exist locally. Selective premixing or mixing before entry into the recombiners does not take place. The maximum decomposition rates and thermal efficiencies are limited by virtue of the flow over the catalytic surfaces and because of the limited convective heat removal. Moreover, the heat storage capacity is small. Excessive quantities of hydrogen can therefore lead to overheating of the coated substrates, so that the ignition limit is reached or exceeded, possibly also culminating as a result in homogeneous gas-phase reactions with deflagration or detonation.

Removal of the heat of reaction from the system is problematic in principle. It takes place almost exclusively by convection from the solid surfaces to the gases flowing past them, as well as by thermal radiation to adjacent structures. Because of the low overall height, upward flow inside the recombiner is slight. The flow is laminar and the heat transmission coefficient is therefore small. The additional heating of the surroundings must also be regarded as a disadvantage.

Furthermore, because of too low oxygen concentrations, high steam and hydrogen concentrations occur in conjunction with recombination, especially at high release rates.

SUMMARY OF THE INVENTION

The present invention is directed to solving the technical problem of reacting both large and also small quantities of hydrogen in a controlled manner in the immediate vicinity of the point of formation, while ensuring in particular an adequate oxygen supply for the reaction even of large quantities of hydrogen.

The technical problem described in the foregoing is solved according to the present invention by a device for elimination of hydrogen. According to the present invention, it has been recognized that in the very case of formation of large quantities of hydrogen, the oxygen needed for recombination must be drawn from the other zones of the containment and selectively fed to the device for reacting hydrogen and oxygen. For this purpose, pressure differences between the point of production of the hydrogen and the other zones of the containment, as well as energy present in the atmosphere, are used to drive machines with which, for example, the atmospheric oxygen needed for elimination is imported and injected together with the hydrogen into the device for reacting hydrogen and oxygen. Thus the quantities of hydrogen entering into the containments can be depleted to the extent that they lie under the ignition limit and that the danger potential is reduced therewith. Furthermore, the heat of reaction produced during elimination is used to drive the machines and is removed if necessary by means of coolers, so that the containment atmospheres are not additionally heated. The device according to the invention is therefore usable, by means of turbine processes, for example, over a large throughput range, since the quantities of hydrogen and steam, which are released in greatly varying rates depending on an accident scenario, can be reacted.

The present invention concerns a device for elimination of hydrogen comprising:

(a) a reactor for reacting hydrogen and oxygen, the reactor being provided with a first inlet line, a second inlet line and an outlet line, wherein the first inlet line admits a hydrogen-containing gas mixture into the reactor and the second inlet line admits a compressed oxygen-containing gas mixture into the reactor, the outlet line discharges a resultant gas mixture from the reactor after at least a partial reaction of the hydrogen and oxygen in the reactor, (b) a turbine connected to a shaft which rotates with the turbine, and (c) a compressor connected to the shaft so that the shaft transmits rotational movement generated by the turbine to the compressor, the compressor receives an oxygen-containing gas mixture and provides the compressed oxygen-containing gas mixture, the compressor being joined by a conduit to the second inlet line to pass the compressed oxygen-containing gas mixture into the reactor.

Since the turbine receives its drive energy from the operating atmosphere, it meets the criteria of passive or, in other words, self-activated safety systems.

Preferably the turbine is disposed upstream from the device for reacting hydrogen and oxygen, and is joined to the inlet line. Thus the turbine is located on the inlet side and is forced to rotate by the incoming gas mixture.

It is also possible to dispose the turbine downstream from the device for reacting hydrogen and oxygen and to connect it with the outlet line. In this case, the gas mixture formed after reaction of the hydrogen is used to drive the turbine. The latter arrangement is advantageous in particular if a second compressor is disposed upstream from the device for reacting hydrogen and oxygen and is joined to the inlet line. In this case, the hydrogen-containing gas mixture flowing into the second compressor is first compressed before being injected into the device for reacting hydrogen and oxygen.

Both a burner and a recombiner can be used as the device for reacting hydrogen and oxygen.

Furthermore, the first and/or the second compressor is advantageously designed as a turbine compressor, so that the large gas streams occurring during accidents can be dealt with by the device according to the invention, by virtue of the high gas throughput rates possible with turbine compressors. In particular, a quantity of air or gas mixture which depends on gas throughput and the speed of the turbine units is fed in this way to the device for reacting hydrogen and oxygen. However, the compressors can also be designed, for example, as piston compressors, as atmospheric steam engines or as Stirling engines.

Furthermore, it has been recognized that the aforementioned problem is also solved by a device for reacting hydrogen and oxygen which is designed as a burner or recombiner and which is disposed under a water surface. By virtue of this inherently independent inventive solution of the aforementioned problem, the large thermal energy generated in the burner or recombiner is removed in the most optimum manner possible, by the fact in particular that full-surface contact with a water volume is achieved.

The aforementioned components to be used according to the present invention, which are also described in the practical examples, are not subject to any particular exceptional conditions as regards their size, geometry, material selection and technical concept, and so the selection criteria known in the area of application can be applied without restriction.

BRIEF DESCRIPTION OF THE DRAWINGS

Further details, features and advantages of the subject matter of the present invention will become clear from the description hereinafter of the associated drawings, in which there are illustrated examples of preferred embodiments of the device according to the present invention for elimination of hydrogen. It is to be understood, however, that the present invention is not limited to the precise arrangements and instrumentalities depicted in the drawings.

DETAILED DESCRIPTION OF THE INVENTION

Figure 1:
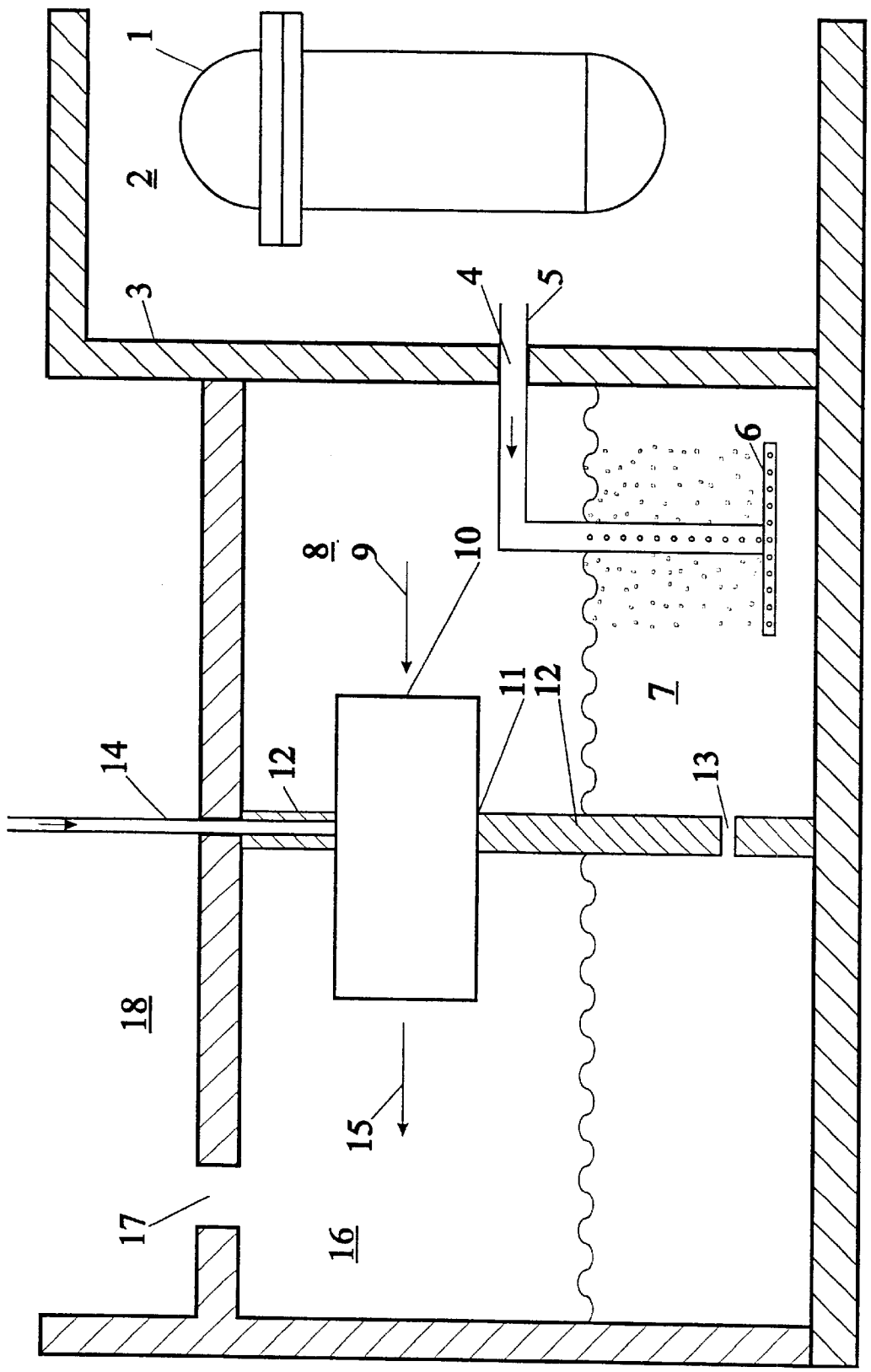
FIG. 1 is an elevational view which shows a device according to the present invention for elimination of hydrogen, as well as the arrangement thereof in a safety enclosure of a nuclear power plant.

FIG. 1 schematically shows a device according to the present invention for elimination of hydrogen with systems for importing air and for selectively feeding the hydrogen-rich accident atmosphere and their arrangement inside a safety enclosure. A pressurized-water reactor ("PWR") of advanced design with a large water storage pit in the vicinity of the reactor pressure vessel has been chosen as a practical example.

Figure 2:
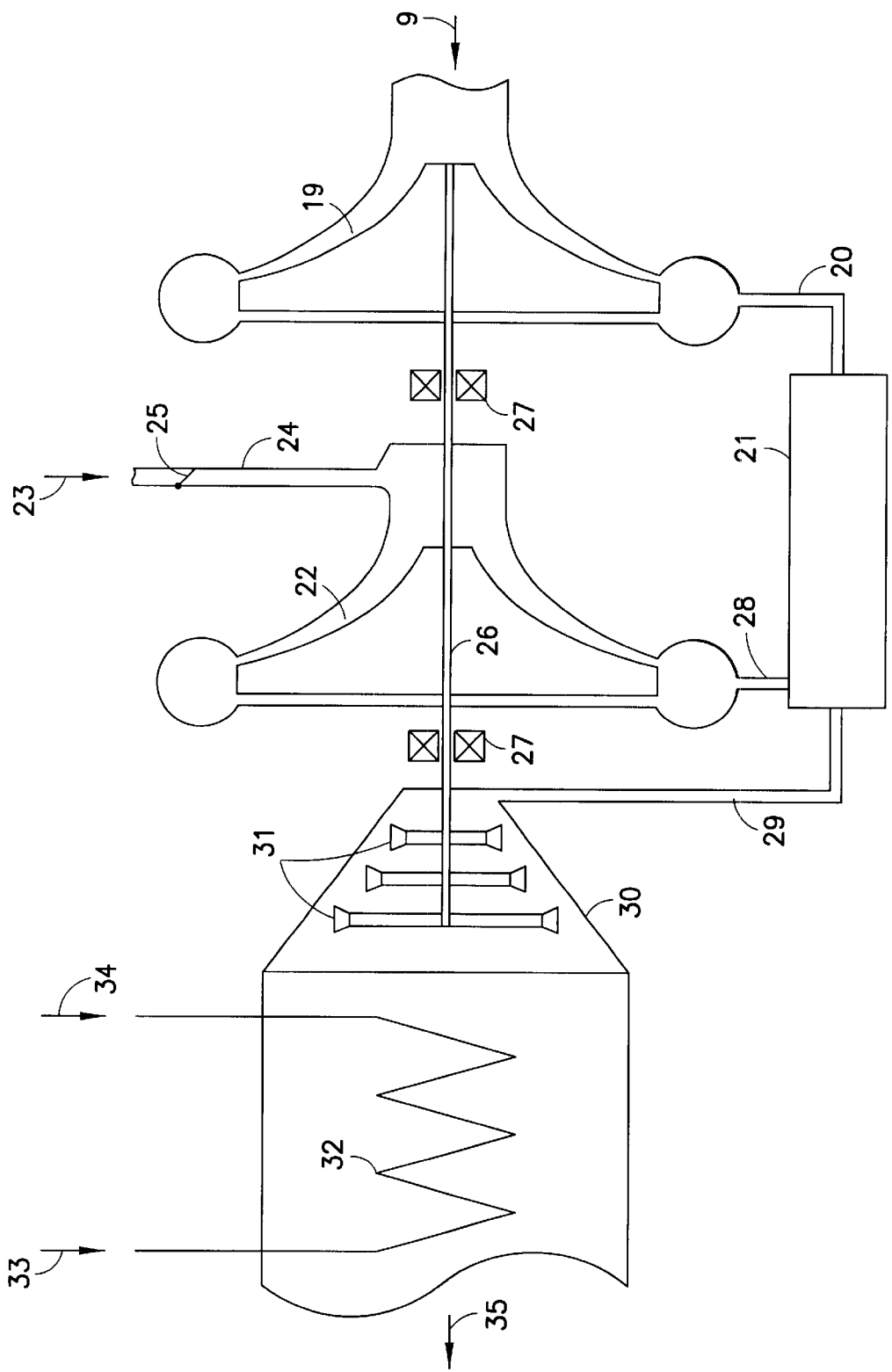
FIG. 2 is an elevational view which shows a first practical example of a device according to the present invention for elimination of hydrogen.
Figure 3:
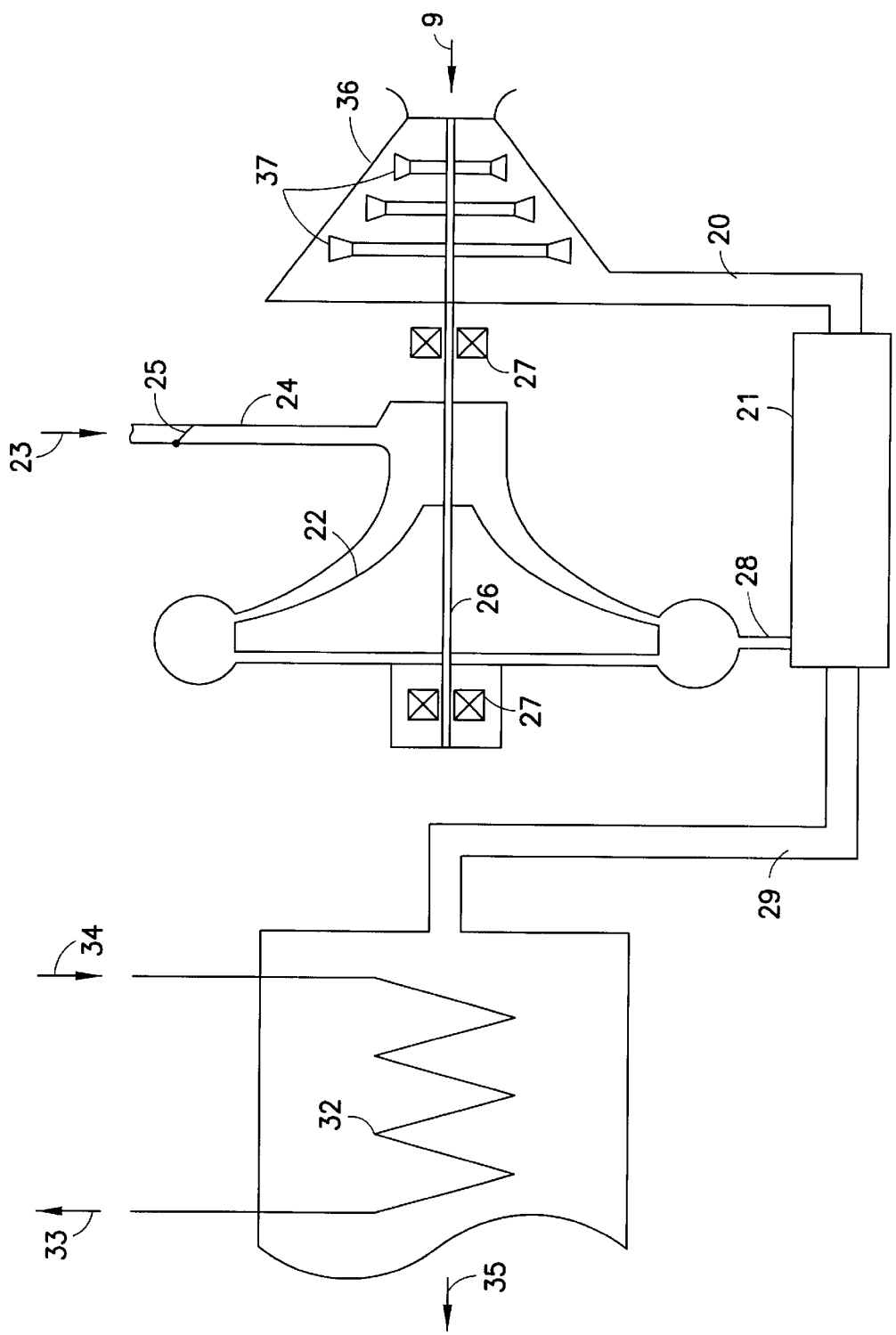
FIG. 3 is an elevational view which shows a second practical example of a device according to the present invention for elimination of hydrogen.

Reactor pressure vessel 1 is disposed inside a safety enclosure 3. After an accident, accident atmosphere 2 is released. In opening 4 of the safety enclosure there is mounted a line 5, through which part of the released accident atmosphere can flow. The arrow in line 5 shows the flow direction. The partial flow streaming through line 5 bubbles through a sparger 6 dipping into water pool 7, and therein gives up part of its heat, mainly by steam condensation. Aerosols are also washed out therein. Above the water pool, there is disposed release chamber 8. By virtue of the excess pressure, a flow 9 takes place through a device 10, which is indicated only schematically and with which both air and hydrogen can be imported and also hydrogen can be eliminated. This device 10, which is illustrated in more detail in FIGS. 2 and 3, is disposed in an opening 11 of partition wall 12.

A line 14 for importing air as shown by the arrow is also indicated in partition wall 12. Mixture 15 exiting the device flows into space 16 and from there through opening 17 into space 18 of the containment disposed thereabove.

To compensate for pressure fluctuations in gas spaces 8 and 16, partition wall 12 is provided with a water penetration 13 in the bottom region of the cooling-water pit. This water penetration 13 also functions as an additional relief vent during extreme pressure surges.

The device described hereinabove leads to mixing of the hydrogen in the immediate vicinity of the point of formation, and by virtue of intermingling of containment air prevents the formation of hydrogen-rich mixtures even in the case of inadequate reaction.

FIG. 2 shows a first embodiment of device 10 illustrated in FIG. 1 described hereinabove. The hydrogen-rich and pressurized atmosphere of release chamber 8 passes through a turbine compressor 19 and a line 20 into a burner or recombiner 21. In burner or recombiner 21, combustion or reaction of the hydrogen already takes place in the presence of atmospheric oxygen in atmosphere 9 of release chamber 8. Thereafter the gas mixture is fed through line 29 to a turbine 30. Therein there occurs expansion, which drives turbine 30 and thus turbine compressor 19 and a further compressor 22. Thus, as described hereinabove, the mixture in line 20 flowing into the burner or recombiner 21 is compressed by means of turbine compressor 19. In principle, the hydrogen can also be fed via a pipe system equipped with nonreturn valves and connecting a plurality of potential release points with the device 10.

By virtue of the reduced pressure on the suction side of compressor 22, atmospheric oxygen 23 needed for further combustion is imported from other zones of the reactor plant through line 24, then compressed and fed to burner or recombiner 21 via a line 28. A nonreturn valve 25 is provided to prevent return flows in line 24.

Motive power for compressor units 19 and 22 is provided in this case, for example, merely via shaft 26, which is suspended to rotate easily in schematically shown bearings 27, such as magnetic bearings. The design of turbine 30 and of turbine compressors 19 and 22 is such that the turbine 30 and turbine compressors 19 and 22 automatically begin to turn in the intended direction of rotation in the presence of free through-flow. The reaction between hydrogen and oxygen takes place in burner or recombiner 21, through which a forced flow passes as a result of upstream compressor stages 19 and 22 and the use of pressure differences. The gas mixture emerging via line 29 contains inert substances, unreacted constituents and reaction products such as steam, whose energy of condensation can also be used in downstream turbine 30. In the present practical example, turbine 30 is provided with three blade rings 31.

A further part of the heat of reaction is removed in a downstream water cooler 32. The hot water is passed through line 33 into external water pits or, by natural convection, to cooling towers disposed at a higher elevation. The cooler water returns to water cooler 32 via line 34. Water pools are available in the form, for example, of pits disposed above the containments or as the pit with water pool 7 indicated in FIG. 1, if pumping systems for circulation of cooling water are also attached to shaft 26. Gas mixture 35 exits toward the left from the overall device as shown in FIG. 2.

FIG. 3 shows a modification of device 10. In this arrangement a turbine unit 36 with blade rings 37 is disposed at the inlet opening of device 10, which turbine 36 is driven by the inflowing hydrogen-rich atmosphere, and in turn therefore also drives comoressor 22 via shaft 26. In this connection, shaft 26 is mounted on shaft bearings 27. By virtue of the expansion of the mixture flowing through line 20, burner or recombiner 21 will work less effectively than in FIG. 2, since only the pressure difference between release chamber 8 and downstream space 16 is used. As before, air 23 is imported via line 24, compressed in compressor 22 and passed via line 28 into burner or recombiner 21. Therein the hydrogen is reacted in the presence of oxygen either catalytically or by using ignition sources. The products then pass via line 29 into cooler 32 with outlet line 33 and inlet line 34. Mixture 35 exits the device in depleted and cooled condition.

Device 10 disposed in opening 11 in the example shown in FIG. 1 can also be mounted optionally in or on aforementioned openings 4 or 17 or at other points at which high hydrogen throughput can be expected. When the heat of reaction is used to drive the turbine compressor unit, it can be assumed, especially at higher hydrogen concentrations, that the entire device will no longer be driven by external excess pressure, but itself will generate a reduced pressure for importation of hydrogen from the surroundings. If necessary, therefore, the intake opening can also be equipped with additional intake pipes in potential hydrogen escape zones. Nonreturn valives n the pipes prevent overflow of hydrogen from the zones with higher release pressures. In this way device 10 can be adapted to the particular requirements. This is true for both embodiments, described hereinabove, of FIGS. 2 and 3. As already mentioned, a pump for delivering cooling water through the cooling unit can also be disposed on the shaft of the devices. Furthermore, couplings to other machines, with which the accident can be better controlled, are also conceivable. Similarly it is also possible to combine cranking or drive machines, although these must not prevent the passive function of device 10 if they fail.

Piston machines, atmospheric steam engines or Stirling engines, which can also be driven with the energy of the containment atmosphere, are also conceivable as alternatives to the turbine compressor units. In the use of Stirling engines, the reaction of the hydrogen could already take place completely or partly at the catalyst-coated heating head.

In the embodiments illustrated in FIGS. 2 and 3, burner or recombiner 21 can also be disposed under the water surface in water pit 7 of FIG. 1, or the reaction products can be passed through a further sparger, in order to achieve effective cooling without a separate cooling loop. A further possibility for improved heat removal and prevention of overheating comprises a modular construction of the burners or recombiners, whereby the surface area of the recombiner can be increased. The reaction inside the recombiner, not only can take place catalytically, but also can be initiated by means of internal ignition.

As discussed above, burners or recombiners 21 can be of a modular construction. This means that a plurality of smaller devices 21 of identical design are operated in parallel. In this way, the external surface area is increased. Thus, more effective removal of the heat of reaction can be achieved and consequently overheating of the catalytic substrate can be prevented. For such modular construction, inlet line 20 conveys the combustion gas to a manifold, which is not shown in the drawings. From there, the combustion gas is fed to the respective modules via smaller individual lines. The exhaust gas exits these modules via one line each, which lines lead via manifolds into main line 29.

It will be appreciated that the instant specification is set forth by way of illustration and not limitation, and that various modifications and changes may be made without departing from the spirit and scope of the present invention.

What is claimed is:

1. A device for elimination of hydrogen comprising:

(a) a reactor for reacting hydrogen and oxygen, the reactor being provided with a first inlet line, a second inlet line and an outlet line, wherein the first inlet line admits a hydrogen-containing gas mixture into the reactor and the second inlet line admits a compressed oxygen-containing gas mixture into the reactor, the outlet line discharges a resultant gas mixture from the reactor after at least a partial reaction of the hydrogen and oxygen in the reactor, (b) a turbine connected to a shaft which rotates with the turbine, the turbine being disposed upstream from the reactor and being joined to the first inlet line, and (c) a compressor connected to the shaft so that the shaft transmits rotational movement generated by the turbine to the compressor, the compressor receives an oxygen-containing gas mixture and provides the compressed oxygen-containing gas mixture, the compressor being joined by a conduit to the second inlet line to pass the compressed oxygen-containing gas mixture into the reactor.

2. The device according to claim 1, wherein the reactor is a burner or a recombiner.

3. The device according to claim 1, wherein the compressor is selected from the group consisting of a turbine compressor, a piston compressor, a stream engine and a Stirling engine.

* * * * *